(12) United States Patent
Matsui (10) Patent No.: US 7,937,960 B2
(45) Date of Patent: May 10, 2011

(54) HUMIDITY CONTROLLER UTILIZING THE PRESSURE DIFFERENTIAL SENSORS FOR VARYING THE COMPRESSOR CAPACITY

(75) Inventor: Nobuki Matsui, Osaka (JP)

(73) Assignee: Daikin Industries, Ltd., Osaka-Shi (JP)

( * ) Notice: Subject to any disclaimer, the term of this patent is extended or adjusted under 35 U.S.C. 154(b) by 354 days.

(21) Appl. No.: 11/920,744

(22) PCT Filed: May 30, 2006

(86) PCT No.: PCT/JP2006/310732
§ 371 (c)(1),
(2), (4) Date: Nov. 20, 2007

(87) PCT Pub. No.: WO2006/129638
PCT Pub. Date: Dec. 7, 2006

(65) Prior Publication Data
US 2009/0165484 A1 Jul. 2, 2009

(30) Foreign Application Priority Data
May 30, 2005 (JP) .................. 2005-158093

(51) Int. Cl.
*F25B 13/00* (2006.01)
*F25B 49/00* (2006.01)
*F25D 23/00* (2006.01)

(52) U.S. Cl. .......... 62/160; 62/228.3; 62/271; 62/324.6; 236/44 A (58) Field of Classification Search ............... 62/277, 62/228.3, 160, 271; 236/44 A
See application file for complete search history.

(56) References Cited

U.S. PATENT DOCUMENTS

| 2,976,701 | A | * | 3/1961 | Greenawalt | 62/324.6 |
| 4,793,143 | A | * | 12/1988 | Rhodes | 62/93 |
| 4,881,376 | A | * | 11/1989 | Yonezawa et al. | 62/106 |
| 6,381,971 | B2 | * | 5/2002 | Honda | 62/126 |
| 6,499,308 | B2 | * | 12/2002 | Inoue et al. | 62/228.3 |
| 6,601,397 | B2 | * | 8/2003 | Pham et al. | 62/181 |
| 2004/0060308 | A1 | * | 4/2004 | Yoshizawa et al. | 62/160 |

* cited by examiner

*Primary Examiner* — Judy J Swann
*Assistant Examiner* — Filip Zec
(74) *Attorney, Agent, or Firm* — Birch, Stewart, Kolasch & Birch, LLP (57) ABSTRACT

A humidity controller includes a differential pressure detection means (93, 97) for detecting a difference between high voltage and low voltage in a refrigeration cycle of a refrigerant circuit (50) and a control means (30) for controlling the capacity of the compressor (53). The control means (30) reduces the capacity of the compressor (53) when a detected value of the differential pressure detection means (93, 97) exceeds a reduction threshold. Further, the control means (30) stops the compressor (53) when the detected value of the differential pressure detection means (93, 97) exceeds a stop threshold higher than the reduction threshold.

7 Claims, 5 Drawing Sheets

FIG. 1A
FIRST ACTION

FIG. 1B
SECOND ACTION

HUMIDITY CONTROLLER UTILIZING THE PRESSURE DIFFERENTIAL SENSORS FOR VARYING THE COMPRESSOR CAPACITY

TECHNICAL FIELD

The present invention relates to a humidity controller including a refrigerant circuit to which a compressor, adsorbent heat exchangers and a switching mechanism are connected.

BACKGROUND ART

There has been known a humidity controller including a refrigerant circuit provided with adsorbent heat exchangers supporting an adsorbent thereon for adsorbing/desorbing moisture. The humidity controller performs air humidification or dehumidification by heating or cooling the adsorbent (e.g., see Patent Literature 1).

More specifically, Patent Literature 1 discloses a humidity controller including a refrigerant circuit provided with a compressor, a four-way switching valve, adsorbent heat exchangers and an expansion valve. Here, two adsorbent heat exchangers are included. In this humidity controller, a refrigeration cycle for circulating a refrigerant in the refrigerant circuit is performed when the compressor is actuated. The direction of refrigerant circulation flow is reversed at predetermined time intervals by the four-way switching valve serving as a switching mechanism because moisture adsorption and desorption by the adsorbent have to be repeated alternately. As a result, an operation in which one of the adsorbent heat exchangers serves as an evaporator and the other serves as a condenser and an operation in which the one of the adsorbent heat exchangers serves as a condenser and the other serves as an evaporator are repeated alternately. On the adsorbent heat exchanger serving as the evaporator, the adsorbent is cooled by the refrigerant and adsorbs moisture in the air. On the adsorbent heat exchanger serving as the condenser, the adsorbent is heated by the refrigerant and desorbs the moisture adsorbed thereon.

Patent Literature 1: Japanese Unexamined Patent Publication No. 2004-294048

DISCLOSURE OF THE INVENTION

Problem that the Invention is to Solve

As described above, the moisture adsorption and desorption by the adsorbent have to be repeated alternately in the above-described humidity controller. For this reason, cooling and heating of the adsorbent heat exchangers are repeated alternately. Different from the switching between cooling and heating in an air conditioner, the switching operation for reversing the direction of the refrigerant circulation flow is carried out in the refrigeration cycle.

In some cases, a difference between high pressure and low pressure in the refrigeration cycle may be relatively large depending on the operating condition. If the switching by the switching mechanism is carried out in this state, troubles may occur, e.g., the switching is not smoothly carried out or the switching mechanism itself is broken.

The present invention has been achieved in view of the above-described circumstances. With respect to a humidity controller including a refrigerant circuit to which a compressor, adsorbent heat exchangers and a switching mechanism are connected, an object of the present invention is to avoid troubles that may occur to the switching mechanism due to the difference between high and low pressures in the refrigeration cycle and improve reliability of the humidity controller.

Means of Solving the Problem

A first aspect of the present invention is directed to a humidity controller (10) including a refrigerant circuit (50) for performing a refrigeration cycle by circulating a refrigerant, wherein a variable capacity compressor (53), first and second adsorbent heat exchangers (51, 52) each supporting an adsorbent thereon and a switching mechanism (54) for reversing the direction of a refrigerant circulation flow are connected to the refrigerant circuit (50), the switching mechanism (54) reverses the direction of the refrigerant circulation flow such that an operation in which one of the first and second adsorbent heat exchangers (51, 52) serves as an evaporator and the other serves as a condenser and an operation in which the one of the first and second adsorbent heat exchangers (51, 52) serves as a condenser and the other serves as an evaporator are alternately carried out and air humidified by the adsorbent heat exchanger (51, 52) serving as the condenser or air dehumidified by the adsorbent heat exchanger (51, 52) serving as the evaporator is supplied to the inside of a room. The humidity controller (10) includes a differential pressure detection means (93, 97) for detecting a difference between high pressure and low pressure in the refrigeration cycle of the refrigerant circuit (50) and a control means (30) for controlling the capacity of the compressor (53), wherein the control means (30) reduces the capacity of the compressor (53) when a detected value of the differential pressure detection means (93, 97) exceeds a reduction threshold.

According to a second aspect of the present invention related to the first aspect of the invention, the control means (30) stops the compressor (53) when the detected value of the differential pressure detection means (93, 97) exceeds a stop threshold higher than the reduction threshold.

A third aspect of the present invention is directed to a humidity controller (10) including a refrigerant circuit (50) for performing a refrigeration cycle by circulating a refrigerant, wherein a variable capacity compressor (53), first and second adsorbent heat exchangers (51, 52) each supporting an adsorbent thereon and a switching mechanism (54) for reversing the direction of a refrigerant circulation flow are connected to the refrigerant circuit (50), the switching mechanism (54) reverses the direction of the refrigerant circulation flow such that an operation in which one of the first and second adsorbent heat exchangers (51, 52) serves as an evaporator and the other serves as a condenser and an operation in which the one of the first and second adsorbent heat exchangers (51, 52) serves as a condenser and the other serves as an evaporator are alternately carried out and air humidified by the adsorbent heat exchanger (51, 52) serving as the condenser or air dehumidified by the adsorbent heat exchanger (51, 52) serving as the evaporator is supplied to the inside of a room. The humidity controller (10) includes a differential pressure detection means (93, 97) for detecting a difference between high pressure and low pressure in the refrigeration cycle of the refrigerant circuit (50) and a control means (30) for controlling the capacity of the compressor (53), wherein the control means (30) stops the compressor (53) when a detected value of the differential pressure detection means (93, 97) exceeds a stop threshold.

A fourth aspect of the present invention is directed to a humidity controller (10) including a refrigerant circuit (50) for performing a refrigeration cycle by circulating a refrigerant, wherein a variable capacity compressor (53), first and second adsorbent heat exchangers (51, 52) each supporting an adsorbent thereon and a switching mechanism (54) for reversing the direction of a refrigerant circulation flow are connected to the refrigerant circuit (50), the switching mechanism (54) reverses the direction of the refrigerant circulation flow such that an operation in which one of the first and second adsorbent heat exchangers (51, 52) serves as an evaporator and the other serves as a condenser and an operation in which the one of the first and second adsorbent heat exchangers (51, 52) serves as a condenser and the other serves as an evaporator are alternately carried out and air humidified by the adsorbent heat exchanger (51, 52) serving as the condenser or air dehumidified by the adsorbent heat exchanger (51, 52) serving as the evaporator is supplied to the inside of a room. The humidity controller (10) includes a differential pressure detection means (93, 97) for detecting a difference between high pressure and low pressure in the refrigeration cycle of the refrigerant circuit (50) and a control means (30) for controlling the capacity of the compressor (53), wherein the control means (30) defines, when a detected value of the differential pressure detection means (93, 97) exceeds the ceiling setting threshold, a capacity of the compressor (53) not higher than a capacity of the compressor (53) at the time when the detected value exceeds the ceiling setting threshold as a ceiling capacity of the compressor (53).

According to a fifth aspect of the present invention related to the fourth aspect of the invention, the control means (30) adjusts the ceiling capacity of the compressor (53) based on the detected value of the differential pressure detection means (93, 97) once the ceiling capacity of the compressor (53) has been defined.

According to a sixth aspect of the present invention related to the fifth aspect of the invention, the control means (30) stops the compressor (53) when the detected value of the differential pressure detection means (93, 97) exceeds a stop threshold higher than the ceiling setting threshold.

According to a seventh aspect of the present invention related to any one of the second, third and sixth aspects of the invention, the control means (30) restarts the compressor (53) after a lapse of a predetermined time from the stop of the compressor (53) every time the compressor (53) is stopped and forbids the restart of the compressor (53) when the number of stops of the compressor (53) reaches a reference number within a reference time.

-Effect-

According to the first aspect of the present invention, the switching mechanism (54) repeatedly reverses the direction of the refrigerant circulation flow in the refrigeration cycle and air humidified by the adsorbent heat exchanger (51, 52) or air dehumidified by the adsorbent heat exchanger (51, 52) is supplied to the inside of the room. The difference between high and low pressures in the refrigeration cycle is detected by the differential pressure detection means (93, 97). Then, the control means (30) reduces the capacity of the compressor (53) when the detected value of the differential pressure detection means (93, 97) exceeds the reduction threshold. As a result, the difference between the high and low pressures in the refrigeration cycle is restrained from increasing.

According to the second aspect of the present invention, the control means (30) stops the compressor (53) when the detected value of the differential pressure detection means (93, 97) exceeds the reduction threshold and the stop threshold. In some cases, the difference between the high and low pressures in the refrigeration cycle may be increased again even after the capacity of the compressor (53) has been reduced. In such a case, according to the second aspect of the present invention, the control means (30) stops the compressor (53) when the difference between the high and low pressures in the refrigeration cycle exceeds the stop threshold.

According to the third aspect of the present invention, the control means (30) stops the compressor (53) when the detected value of the differential pressure detection means (93, 97) exceeds the stop threshold in the refrigeration cycle. If the difference between the high and low pressures in the refrigeration cycle is relatively large when the switching mechanism (54) is working, the operation of the switching mechanism (54) may be adversely affected. The control means (30) stops the compressor (53) using the stop threshold as a guide to judgment before the switching operation is adversely affected.

According to the fourth aspect of the present invention, the control means (30) defines the ceiling capacity of the compressor (53) when the detected value of the differential pressure detection means (93, 97) exceeds the ceiling setting threshold. The ceiling capacity of the compressor (53) is defined as a capacity of the compressor (53) not higher than the capacity of the compressor (53) at the time when the detected value of the differential pressure detection means (93, 97) exceeds the ceiling setting threshold. As a result, the capacity of the compressor (53) is controlled not to exceed the ceiling capacity. Thus, the difference between the high and low pressure in the refrigeration cycle is prevented from increasing.

According to the fifth aspect of the present invention, the ceiling voltage is adjusted based on the detected value of the differential pressure detection means (93, 97) once the ceiling capacity of the compressor (53) has been defined. As a result, the difference between the high and low pressures in the refrigeration cycle is restrained from increasing in response to the operation state.

According to the sixth aspect of the present invention, while the control means (30) controls the capacity of the compressor (53) not to exceed the ceiling capacity, the control means (30) stops the compressor (53) when the detected value of the differential pressure detection means (93, 97) exceeds the stop threshold. In some cases, the difference between the high and low pressures in the refrigeration cycle may be increased even if the capacity of the compressor (53) is controlled not to exceed the ceiling capacity. In such a case, according to the sixth aspect of the invention, the compressor (53) is stopped when the difference between the high and low pressures in the refrigeration cycle exceeds the stop threshold.

According to the seventh aspect of the invention, the control means (30) restarts the compressor (53) every time the compressor (53) is stopped. When the number of stops of the compressor (53) reaches a reference number within a reference time, the control means (30) makes a judgment that the difference between the high and low pressures in the refrigeration cycle is difficult to restrict below a certain level under the operation condition at that time and forbids the restart of the compressor (53).

EFFECT OF THE INVENTION

According to the first, second, fourth, fifth and sixth aspects of the present invention, the control means (30) controls the capacity of the compressor (53) based on the detected value of the differential pressure detection means (93, 97) such that the difference between the high and low pressures in the refrigeration cycle is restrained from increasing. If the difference between the high and low pressures in the refrigeration cycle is relatively large when the switching mechanism (54) is working, the operation of the switching mechanism (54) may be affected adversely or the switching mechanism (54) may possibly be broken. In view of this, according to the present invention, the control means (30) controls the capacity of the compressor (53) based on the detected value of the differential pressure detection means (93, 97) such that the difference between the high and low voltages in the refrigeration cycle does not come to a value that adversely affects the operation of the switching mechanism (54). As a result, troubles that may occur to the switching mechanism (54) due to the difference between the high and low pressures in the refrigeration cycle are surely avoided. Thus, the reliability of the humidity controller (10) is improved.

According to the second aspect of the present invention, even if the difference between the high and low pressures in the refrigeration cycle is increased after the capacity of the compressor (53) has been reduced, the compressor (53) is stopped when the detected value of the differential pressure detection means (93, 97) exceeds the stop threshold. As a result, the difference between the high and low pressures in the refrigeration cycle is surely restrained from increasing to a value that adversely affects the operation of the switching mechanism (54). Thus, the troubles that may occur to the switching mechanism (54) due to the difference between the high and low pressures in the refrigeration cycle are surely avoided and the reliability of the humidity controller (10) is improved.

According to the third aspect of the present invention, when the detected value of the differential pressure detection means (93, 97) exceeds the stop threshold, the control means (30) stops the compressor (53) before the operation of the switching mechanism (54) is affected adversely. As a result, the compressor (53) is stopped before the difference between the high and low pressures in the refrigeration cycle comes to a value that adversely affects the operation of the switching mechanism (54). Thus, the troubles that may occur to the switching mechanism (54) due to the difference between the high and low pressures in the refrigeration cycle are surely avoided and the reliability of the humidity controller (10) is improved.

According to the sixth aspect of the present invention, even if the difference between the high and low pressures in the refrigeration cycle is increased again after the ceiling capacity of the compressor (53) has been defined, the compressor (53) is stopped when the detected value of the differential pressure detection means (93, 97) exceeds the stop threshold. As a result, the difference between the high and low pressures in the refrigeration cycle is surely restrained from increasing to a value that adversely affects the operation of the switching mechanism (54). Thus, the troubles that may occur to the switching mechanism (54) due to the difference between the high and low pressures in the refrigeration cycle are surely avoided and the reliability of the humidity controller (10) is improved.

According to the seventh aspect of the present invention, the control means (30) forbids the restart of the compressor (53) if it is judged difficult to restrict the difference between the high and low pressures in the refrigeration cycle below a certain level under the operation condition at that time. When the difference between the high and low pressures in the refrigeration cycle cannot be restricted below the certain level, a trouble may be occurring to some part of the humidity controller (10). If the restart of the compressor (53) is repeated in this state, the trouble may become worse. According to the seventh aspect of the present invention, such a trouble, if any, is restrained from getting worse.

BRIEF DESCRIPTION OF DRAWINGS

FIG. 1 is a schematic diagram illustrating the structure of a refrigerant circuit of a humidity controller according to an embodiment, wherein

EXPLANATION OF REFERENCE NUMERALS

10 Humidity controller
30 Controller (control means)
50 Refrigerant circuit
51 First adsorbent heat exchanger
52 Second adsorbent heat exchanger
53 Compressor
54 Four-way switching valve (switching mechanism)
93 Suction pressure sensor (differential pressure detection means)
97 Discharge pressure sensor (differential pressure detection means)

BEST MODE FOR CARRYING OUT THE INVENTION

Hereinafter, embodiments of the present invention will be detailed with reference to the drawings. FIG. 1 shows a humidity controller (10) according to the present invention. The humidity controller (10) is configured to perform a dehumidifying operation for dehumidifying outdoor air (OA) taken therein and supplying it to the inside of the room and a humidifying operation for humidifying the outdoor air (OA) taken therein and supplying it to the inside of the room.

The humidity controller (10) includes a refrigerant circuit (50). The refrigerant circuit (50) is a closed circuit provided with a first adsorbent heat exchanger (51), a second adsorbent heat exchanger (52), a compressor (53), a four-way switching valve (54) and a motor-operated expansion valve (55). The refrigerant circuit (50) circulates a refrigerant filled therein to perform a vapor compression refrigeration cycle.

Figure 2:
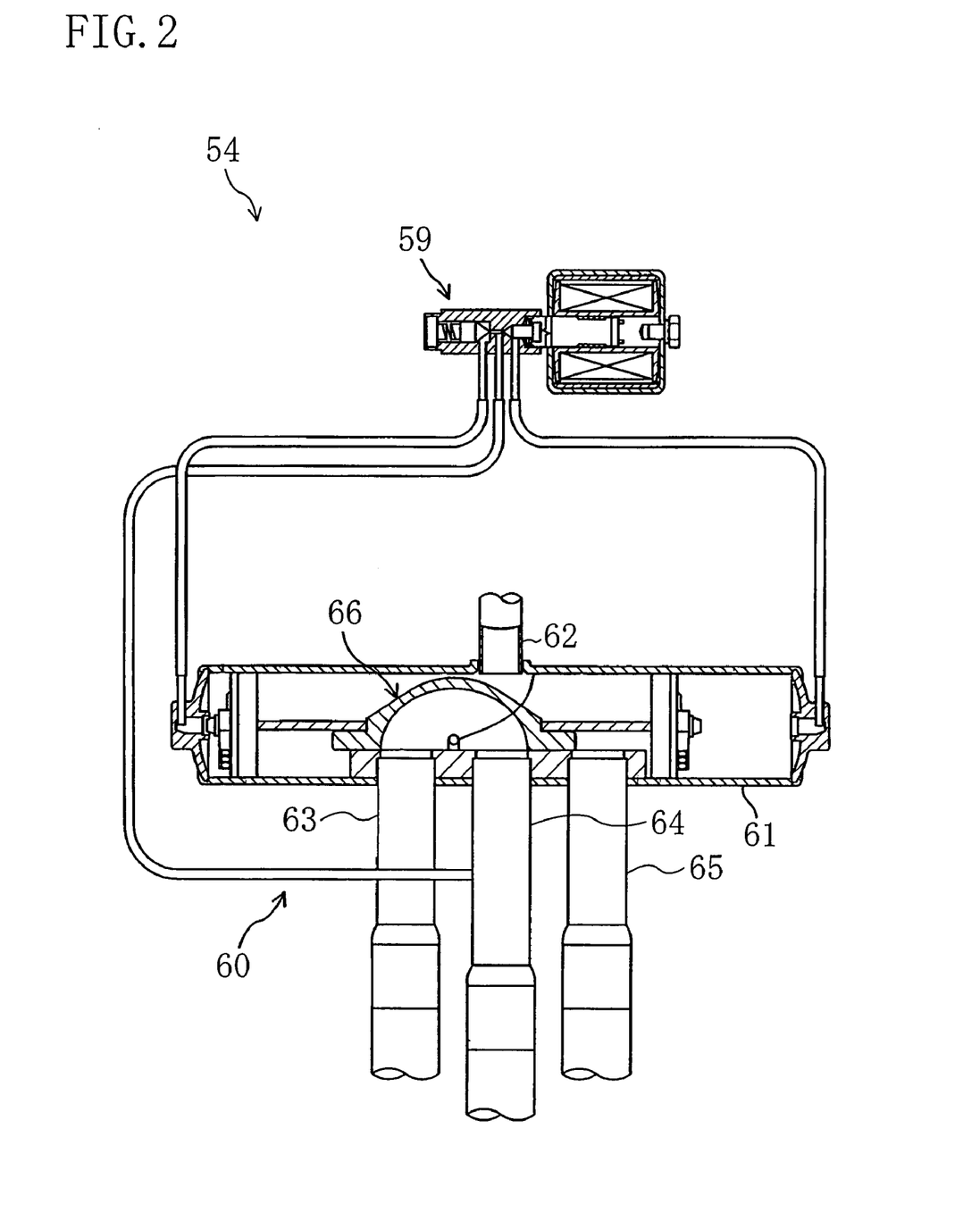
FIG. 2 is a sectional view of a four-way switching valve.

As shown in FIG. 2, the four-way switching valve (54) includes a valve body (60) and a pilot valve (59). The pilot valve (59) includes a solenoid coil and a plunger inserted into a hollow part of the solenoid coil. The pilot valve (59) is configured to switch the communication states of three gas pipes depending on whether the solenoid coil is alive or not. The valve body (60) includes a slidable valving element (66) contained in a closed cylindrical casing (61). The valving element (66) slides as pressures of compressor chambers formed in the right and left parts of the casing (61) are adjusted by the pilot valve (59). A first port (62) is provided at the top of the casing (61). Three ports are provided at the bottom of the casing (61), namely a second port (63), a third port (64) and a fourth port (65) from left to right.

In the refrigerant circuit (50), a discharge side and a suction side of the compressor (53) are connected to a first port and a second port of the four-way switching valve (54), respectively. One end of the first adsorbent heat exchanger (51) is connected to a third port of the four-way switch valve (54) and the other end of the first adsorbent heat exchanger (51) is connected to one end of the second adsorbent heat exchanger (52) via the motor-operated expansion valve (55). The other end of the second adsorbent heat exchanger (52) is connected to a fourth port of the four-way switch valve (54).

The four-way switch valve (54) is configured to be able to switch between a first state where the first port (62) and the second port (63) communicate with each other and the third port (64) and the fourth port (65) communicate with each other (the state shown in FIG. 1A) and a second state where the first port (62) and the fourth port (65) communicate with each other and the second port (63) and the third port (64) communicate with each other (the state shown in FIG. 1B) by sliding the valving element (66).

Figure 3:
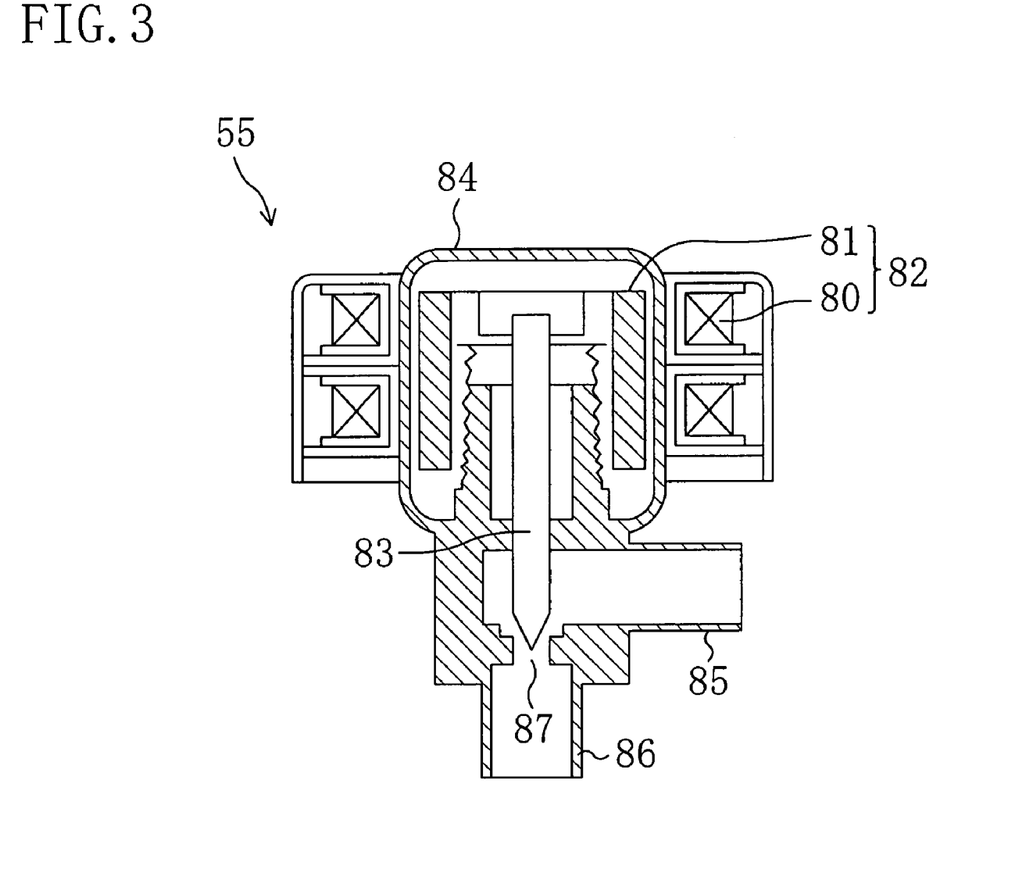
FIG. 3 is a sectional view of a motor-operated expansion valve.

As shown in FIG. 3, the motor-operated expansion valve (55) includes a motor (82) having a stator (80) and a rotor (81) and a valve stem (83) having a conical end. The stator (80) is attached to the outer surface of a cylindrical casing (84) and the rotor (81) is provided in the casing (84) and joined with the valve stem (83). The valve stem (83) is inserted in a penetrating hole formed in the bottom surface of the casing (84). The rotor (81) and the valve stem (83) constitute a rotator. The rotator is fixed to the casing (84) as a female thread cut inside the rotor (81) is screwed onto a male thread protruding from the bottom surface of the casing (84). Thus, the rotator moves up and down as it rotates. Further, an inlet joint (85) opened to the right and an outlet joint (86) opened to the bottom are provided at the bottom of the casing (84). A communication hole (87) is formed at the top of the outlet joint (86) for communication with the inlet joint (85). The rim of the communication hole (87) receives the conical end of the valve stem (83) moving up and down. As the valve stem (83) moves up and down, a gap between the end of the valve stem (83) and the rim of the communication hole (87) is varied. A refrigerant pipe connected to the other end of the first adsorbent heat exchanger (51) is inserted into the inlet joint (85), while a refrigerant pipe connected to the one end of the second adsorbent heat exchanger (51) is inserted into the outlet joint (86).

Figure 4:
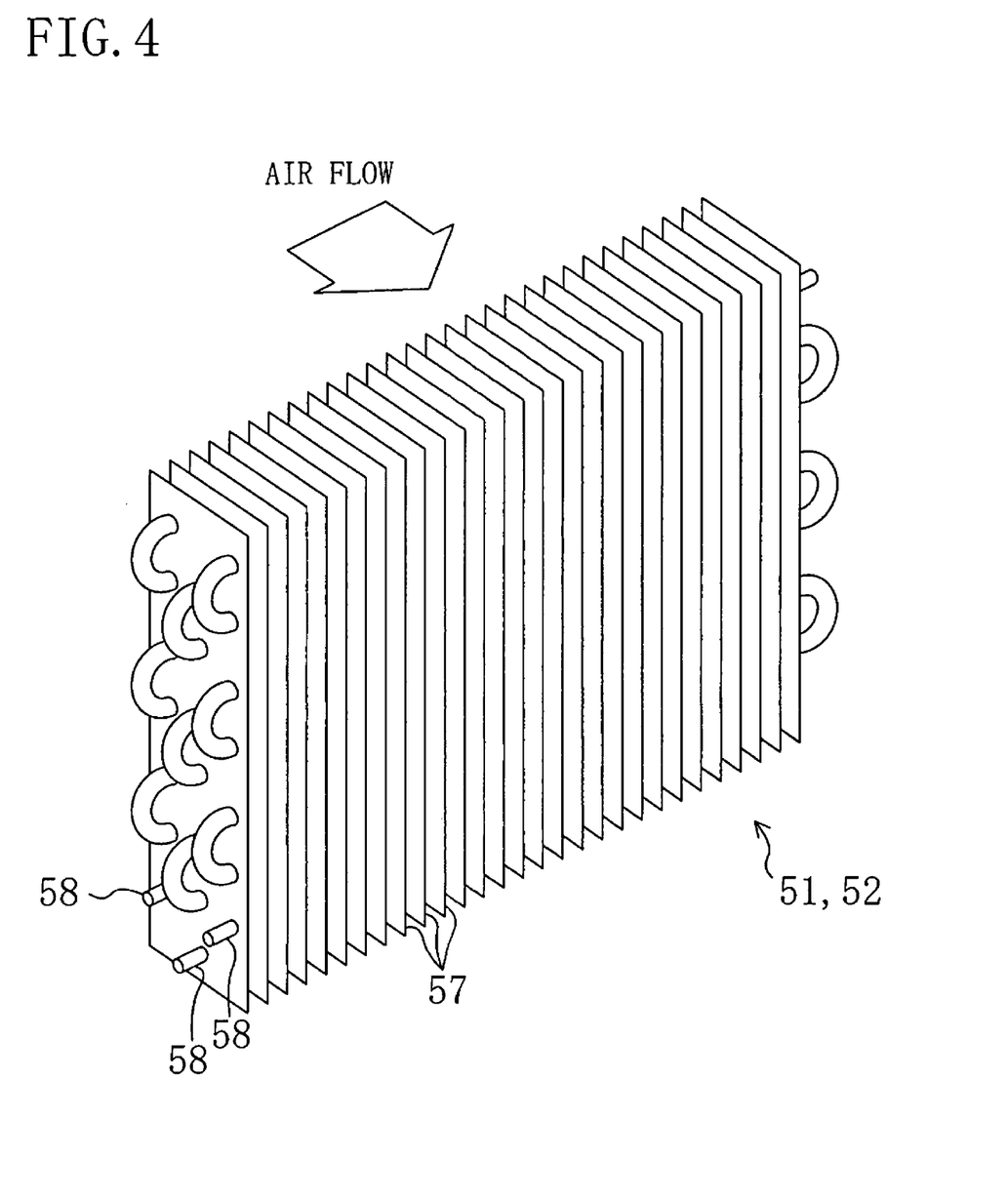
FIG. 4 is a schematic perspective view of an adsorbent heat exchanger.

As shown in FIG. 4, the first and second adsorbent heat exchangers (51, 52) are "cross-fin" type fin-and-tube heat exchangers. Each of the first and second adsorbent heat exchangers (51, 52) includes copper heat transfer tubes (58) and aluminum fins (57). The plurality of fins (57) of the adsorbent heat exchangers (51) and (52) are in the form of a rectangular plate, respectively, and arranged parallel to each other at regular intervals. The heat transfer tubes (58) are arranged to penetrate the fins (57).

The fins (57) of the adsorbent heat exchangers (51, 52) support an adsorbent on their surfaces such that air passing between the fins (57) comes to contact with the adsorbent on their surfaces. Examples of the adsorbent include those capable of adsorbing vapor in the air, such as zeolite, silica gel, activated carbon and organic polymer material having a hydrophilic functional group.

In the refrigerant circuit (50), a suction pressure sensor (93) and a discharge pressure sensor (97) are provided on the suction side and the discharge side of the compressor (53), respectively. The suction pressure sensor (93) measures the pressure of a low pressure refrigerant sucked into the compressor (53). The discharge pressure sensor (97) measures the pressure of a high pressure refrigerant discharged from the compressor (53). A difference between the measurements of the suction pressure sensor (93) and the discharge pressure sensor (97) is detected as a pressure difference ΔP between high and low pressures in the refrigeration cycle performed by the refrigerant circuit (50). That is, the suction pressure sensor (93) and the discharge pressure sensor (97) constitute a differential pressure detection means. The measurements of the suction pressure sensor (93) and the discharge pressure sensor (97) are sent to a controller (30) serving as a control means for controlling the compressor (53). Details of the controller (30) will be described later.

Though not shown, the humidity controller (10) further includes an indoor temperature sensor and an indoor humidity sensor for measuring temperature and humidity of indoor air taken from the inside of the room by the humidity controller (10) and an outdoor temperature sensor and an outdoor humidity sensor for measuring temperature and humidity of outdoor air taken from the outside of the room by the humidity controller (10). The measurements of these sensors are sent to the controller (30).

Though not shown, the humidity controller (10) further includes an input section for inputting desired indoor humidity. The input section is able to select the level of the input humidity from three levels of "low", "medium" and "high". In the controller (30), values or ranges of relative humidity corresponding to the levels of "low", "medium" and "high", respectively, have been stored in advance. In response to the humidity input to the input section, a value or a range of relative humidity corresponding to the input humidity is selected as target humidity.

<Structure of Controller>

The controller (30) adjusts the humidity control performance of the humidity controller (10) such that the relative humidity in the room approaches the target humidity. The controller (30) adjusts the humidity control performance of the humidity controller (10) by controlling operation frequency of the compressor (53). When the operation frequency of the compressor (53) is changed, the capacity of the compressor (53) is varied. Specifically, the rotation speed of a motor provided in the compressor is changed and the amount of the refrigerant discharged from the compressor (53) (the amount of the refrigerant circulating in the refrigerant circuit) is varied.

More specifically, the controller (30) calculates absolute humidity based on the temperature detected by the indoor temperature sensor and the target humidity. Then, the controller (30) sets the calculated absolute humidity as target absolute humidity and adjusts the humidity control performance of the humidity controller (10) such that indoor absolute humidity approaches the target absolute humidity. Further, the controller (81) controls the operation frequency of the compressor (53) based on the pressure difference ΔP detected by the suction pressure sensor (93) and the discharge pressure sensor (97) in the refrigeration cycle to prevent the difference between the high and low pressures in the refrigeration cycle from increasing too much. Details of the operation of the controller (30) will be detailed later.

-Operation-
<Operation of Humidity Controller>

The humidity controller (10) of the present embodiment performs dehumidifying and humidifying operations. The humidity controller (10) during the dehumidifying and humidifying operations controls the humidity of outdoor air (OA) taken therein and supplies it to the inside of the room as supply air (SA). Simultaneously, the humidity controller (10) takes room air (RA) therein and discharges it to the outside of the room as exhaust air (EA). That is, the humidity controller (10) ventilates the room in the dehumidifying and humidifying operations. The humidity controller (10) alternately repeats first and second actions at predetermined time intervals (e.g., 3 minutes) in either of the dehumidifying and humidifying operations.

The humidity controller (10) takes the outdoor air (OA) as first air and the room air (RA) as second air in the dehumidifying operation. On the other hand, the humidity controller (10) takes the room air (RA) as the first air and the outdoor air (OA) as the second air in the humidifying operation.

The first action will be described first. In the first action, the second air is sent to the first adsorbent heat exchanger (51) and the first air is sent to the second adsorbent heat exchanger (52). Recovery of the first adsorbent heat exchanger (51) and adsorption by the second adsorbent heat exchanger (52) are performed in the first action.

Figure 1A:
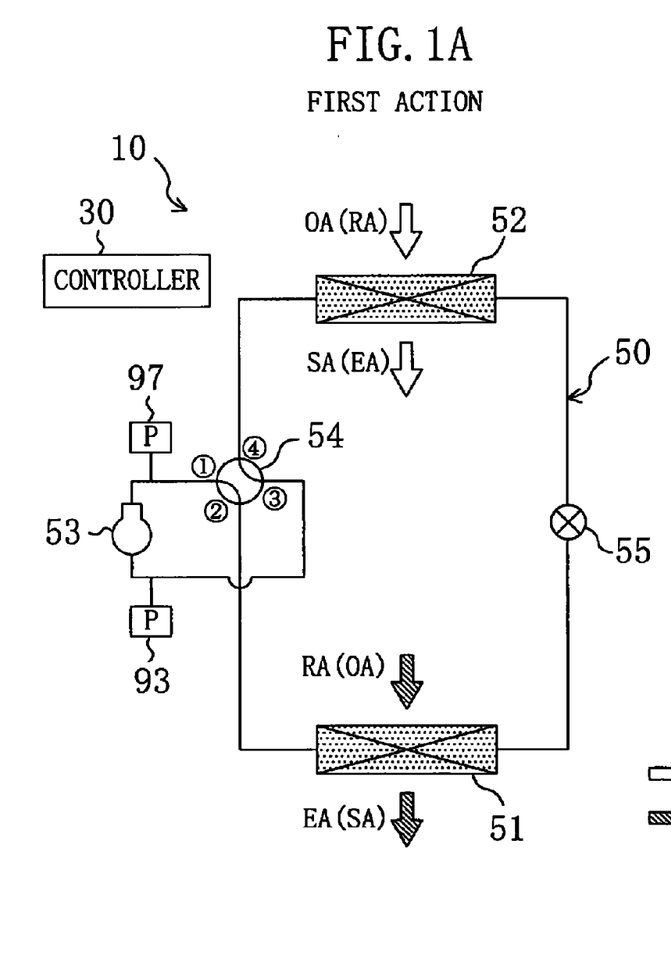
FIG. 1A shows a first action and FIG. 1B shows a second action.

As shown in FIG. 1A, in the refrigerant circuit (50) in the first action, the four-way switching valve (54) is brought into a first state. The refrigerant circulates in the refrigerant circuit (50) when the compressor (53) is operated. More specifically, the refrigerant discharged from the compressor (53) is condensed as it dissipates heat in the first adsorbent heat exchanger (51). The refrigerant condensed by the first adsorbent heat exchanger (51) is reduced in pressure when it passes through the motor-operated expansion valve (55). After that, the refrigerant absorbs heat and evaporates in the second adsorbent heat exchanger (52). The refrigerant evaporated in the second adsorbent heat exchanger (52) is sucked into the compressor (53) for compression and discharged again from the compressor (53).

In this manner, the first adsorbent heat exchanger (51) serves as a condenser and the second adsorbent heat exchanger (52) serves as an evaporator in the refrigerant circuit (50) in the first action. In the first adsorbent heat exchanger (51), the adsorbent on the surfaces of the fins (57) is heated by the refrigerant in the heat transfer tubes (58) and moisture desorbed from the heated adsorbent is given to the second air. On the other hand, in the second adsorbent heat exchanger (52), the adsorbent on the surfaces of the fins (57) adsorbs moisture from the first air. Heat of adsorption is absorbed by the refrigerant in the heat transfer tubes (58).

While the dehumidifying operation is performed, the first air dehumidified by the second adsorbent heat exchanger (52) is supplied to the inside of the room and moisture desorbed from the first adsorbent heat exchanger (51) is discharged to the outside of the room together with the second air. In the humidification operation, on the other hand, the second air humidified by the first adsorbent heat exchanger (51) is supplied to the inside of the room and the first air that lost moisture in the second adsorbent heat exchanger (52) is discharged to the outside of the room.

Next, the second action will be explained. In the second action, the first air is sent to the first adsorbent heat exchanger (51) and the second air is sent to the second adsorbent heat exchanger (52). Recovery of the second adsorbent heat exchanger (52) and adsorption by the first adsorbent heat exchanger (51) are performed in the second action.

Figure 1B:
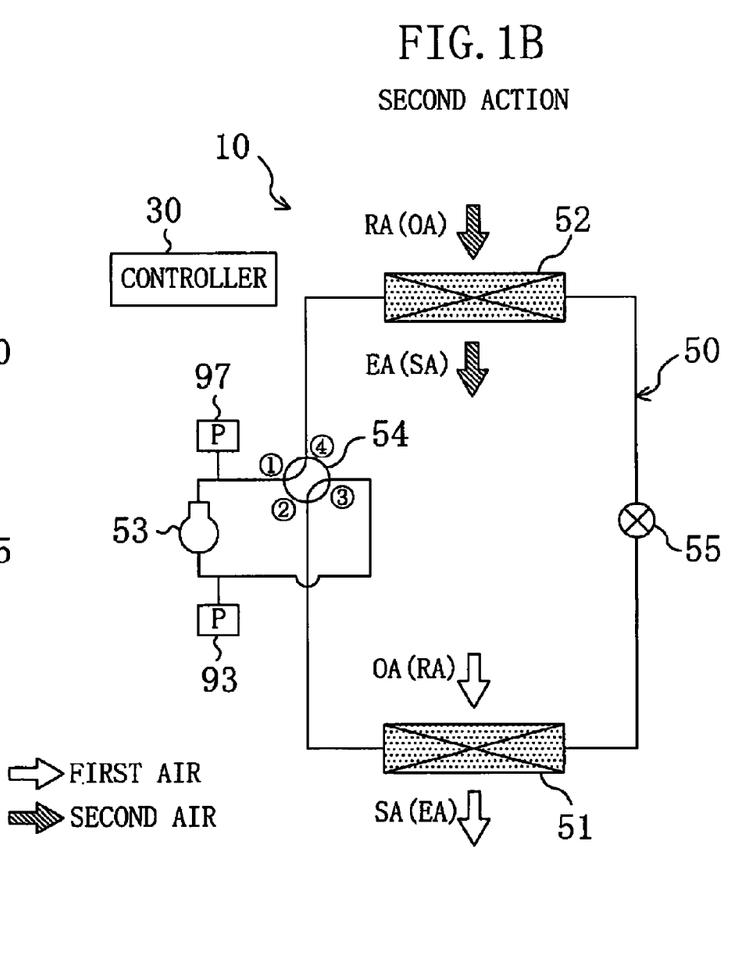

As shown in FIG. FIG. 1B, in the refrigerant circuit (50) in the second action, the four-way switching valve (54) is brought into a second state. The refrigerant circulates in the refrigerant circuit (50) when the compressor (53) is operated. More specifically, the refrigerant discharged from the compressor (53) is condensed as it dissipates heat in the second adsorbent heat exchanger (52). The refrigerant condensed by the second adsorbent heat exchanger (52) is reduced in pressure when it passes through the motor-operated expansion valve (55). After that, the refrigerant absorbs heat and evaporates in the first adsorbent heat exchanger (51). The refrigerant evaporated in the first adsorbent heat exchanger (51) is sucked into the compressor (53) for compression and discharged again from the compressor (53).

In this manner, the second adsorbent heat exchanger (52) serves as a condenser and the first adsorbent heat exchanger (51) serves as an evaporator in the refrigerant circuit (50). In second adsorbent heat exchanger (52), the adsorbent on the surfaces of the fins (57) is heated by the refrigerant in the heat transfer tubes (58) and moisture desorbed from the heated adsorbent is given to the second air. On the other hand, in the first adsorbent heat exchanger (51), the adsorbent on the surfaces of the fins (57) adsorbs moisture from the first air. Heat of adsorption is absorbed by the refrigerant in the heat transfer tubes (58).

While the dehumidifying operation is performed, the first air dehumidified by the first adsorbent heat exchanger (51) is supplied to the inside of the room and moisture desorbed from the second adsorbent heat exchanger (52) is discharged to the outside of the room together with the second air. In the humidification operation, on the other hand, the second air humidified by the second adsorbent heat exchanger (52) is supplied to the inside of the room and the first air that lost moisture in the first adsorbent heat exchanger (51) is discharged to the outside of the room.

<Operation of Controller>

Now, the operation of the controller (30) will be explained.

First, the operation of the controller (30) upon actuation of the humidity controller (10) will be explained. The controller (30) sets a target humidity based on an input from the input section and determines the humidity control performance of the humidity controller (10) based on the target humidity, and then actuates the humidity controller (10).

More specifically, the controller (30) sets the target humidity and then calculates absolute humidity based on the target humidity and the temperature detected by the indoor temperature sensor as target absolute humidity. The controller (30) calculates absolute humidity of the outdoor air (OA) based on the detected outdoor temperature and humidity, as well as absolute humidity of the room air (RA) based on the detected indoor temperature and humidity. Then, the controller (30) determines operation frequency of the compressor (50) based on the absolute humidities of the outdoor air (OA) and the room air (RA) and the target absolute humidity such that the indoor absolute humidity approaches the target absolute humidity. As a result, the humidity control performance of the humidity controller (10) is determined. The maximum operation frequency of the compressor (53) is Fm.

Subsequently, the operation of the controller (30) after the actuation of the humidity controller (10) will be explained. After the actuation of the humidity controller (10), the controller (30) adjusts the operation frequency of the compressor (53) while checking the indoor humidity. When the pressure difference $\Delta P$ detected by the suction pressure sensor (93) and the discharge pressure sensor (97) is increased, the controller (30) restricts the operation of the compressor (53) based on the pressure difference $\Delta P$.

Figure 5:
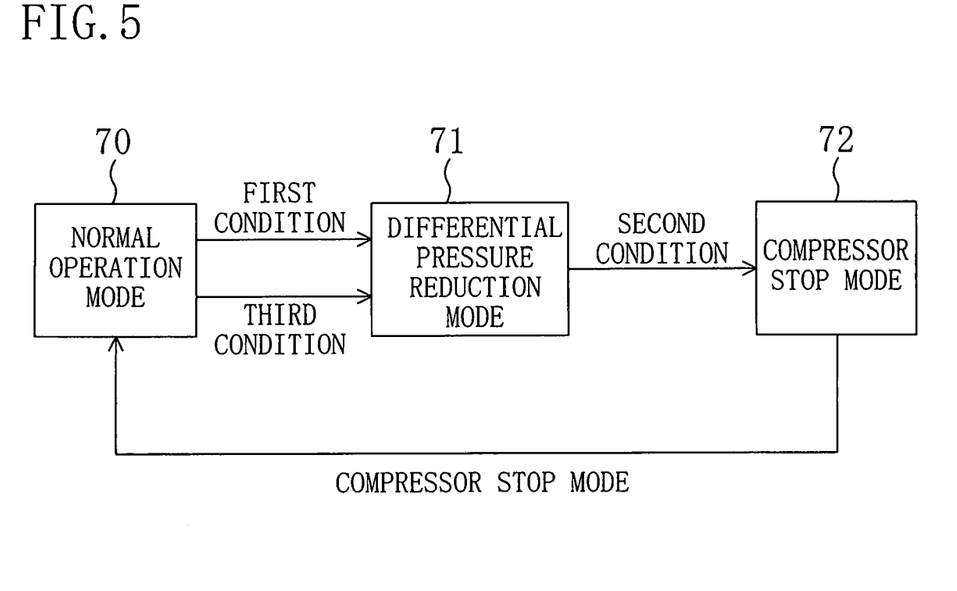
FIG. 5 is a control flow diagram for illustrating the operation of a controller according to an embodiment.

As shown in FIG. 5, the controller (30) has modes for controlling the compressor (53), namely, a normal operation mode (70) for determining the operation frequency of the compressor (53) based on the target humidity irrespective of the pressure difference $\Delta P$, a differential pressure reduction mode (71) for limiting the operation frequency of the compressor (53) based on the pressure difference $\Delta P$ and a compressor stop mode (72) for compulsorily stopping the compressor (53). At the actuation of the humidity controller (10), the controller (30) is in the normal operation mode (70). The controller (30) is shifted to the differential pressure reduction mode (71) when a first condition is met. Further, the controller (30) is shifted to the compressor stop mode (72) when a second condition is met in the differential pressure reduction mode (71). If a third condition is met in the differential pressure reduction mode (71), the controller (30) returns to the normal operation mode (70). The controller (30) returns to the normal operation mode (70) also when the compressor (53) is stopped in the differential pressure reduction mode (71). Further, the controller (30) returns to the normal operation mode (70) after a predetermined time (e.g., 3 minutes) has elapsed in the compressor stop mode (72) and restarts the compressor (53).

To be more specific, the first condition is that the pressure difference ΔP exceeds a first threshold S1 which is a ceiling setting threshold (e.g., a gauge pressure of 2.7 MPa) when the compressor (53) is operated. When the pressure difference ΔP exceeds the first threshold S1 in the normal operation mode (70), the controller (30) is shifted to the differential pressure reduction mode (71) to prevent the difference between the high and low pressures in the refrigeration cycle from increasing. In the differential pressure reduction mode (71), a value of the operation frequency of the compressor (53) at the time when the pressure difference ΔP exceeds the first threshold S1 is defined as a ceiling Fx of the operation frequency of the compressor (53). After the ceiling is defined, the operation frequency of the compressor (53) is controlled not to exceed the ceiling Fx. The ceiling Fx may be a value smaller than the operation frequency of the compressor (53) at the time when the pressure difference ΔP exceeds the first threshold S1.

In the differential pressure reduction mode (71), the ceiling of the operation frequency of the compressor (53) is adjusted based on the pressure difference ΔP. More specifically, when the pressure difference ΔP exceeds a third threshold S3 which is a reduction threshold (e.g., a gauge pressure of 2.9 MPa), the ceiling of the operation frequency of the compressor (53) is modified to Fx' obtained by the following first equation. As a result, when X=5, the ceiling of the operation frequency of the compressor (53) is raised by 15 Hz. If the pressure difference ΔP exceeds a second threshold S2 which is a reduction threshold (e.g., a gauge pressure of 2.8 MPa), the ceiling of the operation frequency of the compressor (53) is modified to Fx' obtained by the following second equation. As a result, when X=5, the ceiling of the operation frequency of the compressor (53) is raised by 5 Hz. If the pressure difference ΔP remains below the first threshold S1 for A minutes (e.g., 6 minutes), the ceiling of the operation frequency of the compressor (53) is modified to Fx' obtained by the following third equation. As a result, when X=5, the ceiling of the operation frequency of the compressor (53) is raised by 5 Hz. The values of A, S1, S2 and X are indicated for the purpose of explanation only.

$$Fx'=Fx-3X \qquad \text{First equation}$$

$$Fx'=Fx-X \qquad \text{Second equation}$$

$$Fx'=Fx+X \qquad \text{Third equation}$$

In the differential pressure reduction mode (71), the operation frequency of the compressor (53) is limited not to exceed the ceiling. When the pressure difference ΔP is increased and the second condition is met, the operation of the four-way switching valve (54) may possibly be affected adversely. Therefore, the controller (30) is shifted to the compressor stop mode (72). The second condition is at least one of a condition that the pressure difference ΔP remains above the third threshold S3 as the stop threshold for B seconds (e.g., 20 seconds) and a condition that the pressure difference ΔP exceeds a fourth threshold S4 as the stop threshold (e.g., a gauge pressure of 3.0 MPa). If the second condition is met, the controller (30) is shifted to the compressor stop mode (72) to stop the compressor (53). As a result, troubles that may occur to the four-way switching valve (54) due to the pressure difference ΔP are avoided. The values of B, S3 and S4 are indicated for the purpose of explanation only.

Then, a third condition will be explained. If the third condition is met in the differential pressure reduction mode (71), it is ascertained that the difference between the high and low pressures in the refrigeration cycle is not increased. Therefore, the controller (30) returns to the normal operation mode (70). More specifically, the third condition is at least one of a condition that the pressure difference ΔP remains below the first threshold S1 for C minutes (e.g., 6 minutes) when the operation frequency of the compressor (53) has reached a maximum value Fm and a condition that the pressure difference ΔP remains below a fifth threshold S5 (e.g., a gauge pressure of 2.6 MPa) for D minutes (e.g., 6 minutes). The values of C, D and S5 are indicated for the purpose of explanation only.

After a lapse of a predetermined time (e.g., 3 minutes) in the compressor stop mode (72), the controller (30) returns to the normal operation mode (70) and restarts the compressor (53). After the restart of the compressor (53), the controller (30) carries out the control of the compressor (53) in the above-described manner.

The controller (30) counts the number of stops of the compressor (53). If the number of stops of the compressor (53) reaches a reference number (e.g., 10 stops) within a reference time (e.g., 200 minutes), the controller (30) judges that a trouble has occurred to the humidity controller (10) and forbids the restart of the compressor (53).

Effect of Embodiment

According to the above-described embodiment, when the pressure difference ΔP detected by the suction pressure sensor (93) and the discharge pressure sensor (97) is increased, the controller (30) sets a ceiling on the operation frequency of the compressor (53) to prevent the difference between the high and low pressures in the refrigeration cycle from increasing. When the pressure difference ΔP is increased again, the operation frequency of the compressor (53) is reduced to further prevent the difference between the high and low pressures in the refrigeration cycle from increasing. If the difference between the high and low pressures in the refrigeration cycle is relatively large when the valving element (66) of the four-way switching valve (54) slides, a pressure difference between the inside and outside of the valving element (66) is increased too much and the valving element (66) is pressed hard onto a surface on which it slides. As a result, the valving element (66) cannot slide or the four-way switching valve (54) may possibly be broken. To cope with these defects, the controller (30) of the present embodiment controls the operation frequency of the compressor (53) based on the pressure difference ΔP such that the difference between the high and low pressures in the refrigeration cycle does not come to a value that adversely affects the operation of the four-way switching valve (54). As the troubles that may occur to the four-way switching valve (54) due to the difference between the high and low pressures in the refrigeration cycle are avoided, the reliability of the humidity controller (10) is improved.

If the difference between the high and low pressures in the refrigeration cycle is relatively large, considerable force is applied to the valve stem (83) in its axis direction when the refrigerant enters the outlet joint (86) of the motor-operated expansion valve (55). As a result, troubles may occur, e.g., the valve stem (83) may come off. According to the present embodiment, the controller (30) controls the operation frequency of the compressor (53) based on the pressure difference ΔP such that the difference between the high and low pressures in the refrigeration cycle does not come to a value that adversely affects the operation of the motor-operated expansion valve (55). Thus, the troubles that may occur to the motor-operated expansion valve (55) due to the difference between the high and low pressures in the refrigeration cycle are also avoided.

According to the above-described embodiment, even if the difference between the high and low pressures in the refrigeration cycle is increased after the operation frequency of the compressor (53) has been reduced, the compressor (53) is stopped when the pressure difference ΔP exceeds the stop threshold. As a result, the difference between the high and low pressures in the refrigeration cycle is surely restrained from increasing to a value that adversely affects the operation of the four-way switching valve (54).

According to the above-described embodiment, when the number of stops of the compressor (53) reaches a reference number within a reference time, a judgment is made that the difference between the high and low pressures in the refrigeration cycle is difficult to restrict below a certain level under the operation condition at that time and the controller (30) forbids the restart of the compressor (53). When the difference between the high and low pressures in the refrigeration cycle cannot be restricted below the certain level, a trouble may be occurring to some part of the humidity controller (10). If the restart of the compressor (53) is repeated in this state, the trouble may become worse. The present embodiment allows prevention of the trouble, if any, from getting worse.

Other Embodiments

The above-described embodiment may be modified in the following manner.

The controller (30) of the above-described embodiment is operated in the normal operation mode (70), the differential pressure reduction mode (71) and the compressor stop mode (72). Different from the embodiment, the differential pressure reduction mode (71) may be omitted such that the controller (30) is directly shifted from the normal operation mode (70) to the compressor stop mode (72) when the pressure difference ΔP exceeds the stop threshold. In this case, the controller (30) immediately stops the compressor (53) when the pressure difference ΔP exceeds, for example, the fourth threshold S4, in the normal operation mode (70).

Further, unlike the above-described embodiment, the ceiling of the operation frequency of the compressor (53) may not be defined and the controller (30) may be configured to reduce the operation frequency of the compressor (53) immediately when the pressure difference ΔP exceeds, for example, the second threshold S2.

The embodiments described above are preferable illustrations and do not limit the present invention, its application and the scope of use of the invention.

INDUSTRIAL APPLICABILITY

As described above, the present invention is useful for a humidity controller including a refrigerant circuit to which a compressor, adsorbent heat exchangers and a switching mechanism are connected.

The invention claimed is:

1. A humidity controller comprising:
a refrigerant circuit for performing a refrigeration cycle by circulating a refrigerant,
a variable capacity compressor, first and second adsorbent heat exchangers each supporting an adsorbent thereon and a switching mechanism for reversing the direction of a refrigerant circulation flow being connected to the refrigerant circuit,
the switching mechanism reversing the direction of the refrigerant circulation flow such that an operation in which one of the first and second adsorbent heat exchangers serves as an evaporator and the other serves as a condenser and an operation in which the one of the first and second adsorbent heat exchangers serves as a condenser and the other serves as an evaporator are alternately carried out and
air humidified by the adsorbent heat exchanger serving as the condenser or air dehumidified by the adsorbent heat exchanger serving as the evaporator being supplied to the inside of a room, wherein
the switching mechanism is a four-way switching valve which includes a valving element, and reverses the direction of the refrigerant circulation flow by sliding the valving element,
the four-way switching valve reverses the direction of the refrigerant circulation flow by sliding the valving element at predetermined time intervals while the compressor is operated,
the humidity controller further includes:
a differential pressure detector for detecting a difference between high pressure and low pressure in the refrigeration cycle of the refrigerant circuit, and
a controller for controlling the capacity of the compressor,
the controller reduces the capacity of the compressor when a detected value of the differential pressure detector exceeds a reduction threshold, and
the reduction threshold is set to a value at which normal sliding of the valving element of the four-way switching valve is ensured.

2. The humidity controller of claim 1, wherein
the controller stops the compressor when the detected value of the differential pressure detector exceeds a stop threshold higher than the reduction threshold.

3. A humidity controller comprising:
a refrigerant circuit for performing a refrigeration cycle by circulating a refrigerant,
a variable capacity compressor, first and second adsorbent heat exchangers each supporting an adsorbent thereon and a switching mechanism for reversing the direction of a refrigerant circulation flow being connected to the refrigerant circuit,
the switching mechanism reversing the direction of the refrigerant circulation flow such that an operation in which one of the first and second adsorbent heat exchangers serves as an evaporator and the other serves as a condenser and an operation in which the one of the first and second adsorbent heat exchangers serves as a condenser and the other serves as an evaporator are alternately carried out and
air humidified by the adsorbent heat exchanger serving as the condenser or air dehumidified by the adsorbent heat exchanger serving as the evaporator being supplied to the inside of a room, wherein
the switching mechanism is a four-way switching valve which includes a valving element, and reverses the direction of the refrigerant circulation flow by sliding the valving element, the four-way switching valve reverses the direction of the refrigerant circulation flow by sliding the valving element at predetermined time intervals while the compressor is operated, the humidity controller further includes:

a differential pressure detector for detecting a difference between high pressure and low pressure in the refrigeration cycle of the refrigerant circuit and a controller for controlling the capacity of the compressor, the controller stops the compressor when a detected value of the differential pressure detector exceeds a stop threshold, and the stop threshold is set to a value at which normal sliding of the valving element of the four-way switching valve is ensured.

4. A humidity controller comprising:

a refrigerant circuit for performing a refrigeration cycle by circulating a refrigerant, a variable capacity compressor, first and second adsorbent heat exchangers each supporting an adsorbent thereon and a switching mechanism for reversing the direction of a refrigerant circulation flow being connected to the refrigerant circuit, the switching mechanism reversing the direction of the refrigerant circulation flow such that an operation in which one of the first and second adsorbent heat exchangers serves as an evaporator and the other serves as a condenser and an operation in which the one of the first and second adsorbent heat exchangers serves as a condenser and the other serves as an evaporator are alternately carried out and air humidified by the adsorbent heat exchanger serving as the condenser or air dehumidified by the adsorbent heat exchanger serving as the evaporator being supplied to the inside of a room, wherein the switching mechanism is a four-way switching valve which includes a valving element, and reverses the direction of the refrigerant circulation flow by sliding the valving element, the four-way switching valve reverses the direction of the refrigerant circulation flow by sliding the valving element at predetermined time intervals while the compressor is operated, the humidity controller further includes:

a differential pressure detector for detecting a difference between high pressure and low pressure in the refrigeration cycle of the refrigerant circuit and a controller for controlling the capacity of the compressor, the controller defines, when a detected value of the differential pressure detector exceeds a ceiling setting threshold, a capacity of the compressor not higher than a capacity of the compressor at the time when the detected value exceeds the ceiling setting threshold as a ceiling capacity of the compressor, and the ceiling setting threshold is set to a value at which normal sliding of the valving element of the four-way switching valve is ensured.

5. The humidity controller of claim 4, wherein the controller- adjusts the ceiling capacity of the compressor based on the detected value of the differential pressure detector once the ceiling capacity of the compressor has been defined.

6. The humidity controller of claim 5, wherein the controller stops the compressor when the detected value of the differential pressure detector exceeds a stop threshold higher than the ceiling setting threshold.

7. The humidity controller of any one of claims 2, 3 and 6, wherein the controller restarts the compressor after a lapse of a predetermined time from the stop of the compressor every time the compressor is stopped and forbids the restart of the compressor when the number of stops of the compressor reaches a reference number within a reference time.

\* \* \* \* \*

UNITED STATES PATENT AND TRADEMARK OFFICE
CERTIFICATE OF CORRECTION

| | | |
|---|---|---|
| PATENT NO. | : 7,937,960 B2 | Page 1 of 1 |
| APPLICATION NO. | : 11/920744 | |
| DATED | : May 10, 2011 | |
| INVENTOR(S) | : Nobuki Matsui | |

It is certified that error appears in the above-identified patent and that said Letters Patent is hereby corrected as shown below:

ON THE TITLE PAGE:

At Item (56), References Cited, insert the following:

--FOREIGN PATENT DOCUMENTS

| | | | |
|---|---|---|---|
| EP | 0751356 | A2 | 01/02/1997 |
| EP | 1489370 | A1 | 12/22/2004 |
| JP | 2004-294048 | A | 10/21/2004 |
| JP | 2004-353889 | A | 12/16/2004 |
| JP | 2005-9794 | A | 01/13/2005 |
| JP | 8-100944 | A | 04/16/1996-- |

Signed and Sealed this
Nineteenth Day of July, 2011

David J. Kappos
*Director of the United States Patent and Trademark Office*